(12) United States Patent
Harris et al.

(10) Patent No.: US 8,511,066 B2
(45) Date of Patent: Aug. 20, 2013

(54) MULTI-STAGE TURBOCHARGING SYSTEM WITH THERMAL BYPASS

(75) Inventors: Michael E. Harris, Fairview, NC (US); Brock Fraser, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 327 days.

(21) Appl. No.: 12/919,058

(22) PCT Filed: Feb. 24, 2009

(86) PCT No.: PCT/US2009/035008
§ 371 (c)(1),
(2), (4) Date: Aug. 24, 2010

(87) PCT Pub. No.: WO2009/111223
PCT Pub. Date: Sep. 11, 2009

(65) Prior Publication Data
US 2011/0061381 A1 Mar. 17, 2011

Related U.S. Application Data

(60) Provisional application No. 61/032,870, filed on Feb. 29, 2008.

(51) Int. Cl.
*F01N 5/04* (2006.01)
*F01N 3/00* (2006.01)
*F02B 33/44* (2006.01)

(52) U.S. Cl.
USPC .................................. 60/284; 60/280; 60/612

(58) Field of Classification Search
USPC .................... 60/612, 284; 123/562
See application file for complete search history.

(56) References Cited

U.S. PATENT DOCUMENTS

| | | | | | |
|---|---|---|---|---|---|
| 4,235,076 | A | * | 11/1980 | Meloche et al. | 60/602 |
| 4,244,187 | A | * | 1/1981 | Lane et al. | 60/602 |
| 5,974,792 | A | * | 11/1999 | Isobe | 60/278 |
| 6,354,078 | B1 | * | 3/2002 | Karlsson et al. | 60/274 |
| 6,543,228 | B2 | * | 4/2003 | Deacon | 60/602 |
| 6,702,190 | B1 | * | 3/2004 | Nohl et al. | 237/12.3 C |

(Continued)

FOREIGN PATENT DOCUMENTS

| | | |
|---|---|---|
| EP | 1306534 A2 | 5/2003 |
| EP | 1672197 A1 | 6/2006 |
| JP | 2007154684 A | 6/2007 |
| WO | 2004097195 A1 | 11/2004 |

*Primary Examiner* — Thomas Denion
*Assistant Examiner* — Mickey France
(74) *Attorney, Agent, or Firm* — William G. Anderson; Stephan A. Pendorf; Patent Central LLC (57) ABSTRACT

A two-stage turbocharging system with a high pressure (HP) turbine and a low pressure (LP) turbine, exhaust piping connecting an engine to the HP turbine inlet, exhaust piping connecting the HP turbine outlet to the LP turbine inlet, piping connecting the LP turbine outlet to an aftertreatment device, and branched bypass piping having an inlet and first and second branches, the inlet connected to the engine to HP turbine inlet exhaust piping, the first branch outlet connected to the LP turbine inlet, the second branch outlet connected to the aftertreatment device, and an R2S valve in the first branch and a warm-up valve in said second branch. By opening of the valve, exhaust gas can bypass both the HP and LP turbines and flow to, e.g., the catalytic converter. The R2S valve and the warm-up valve may be integrated into a single exhaust flow control unit.

12 Claims, 10 Drawing Sheets

(56) References Cited

U.S. PATENT DOCUMENTS

| | | |
|---|---|---|
| 6,973,787 B2 * | 12/2005 | Klingel .................... 60/612 |
| 6,976,359 B2 * | 12/2005 | Hastings et al. ............ 60/602 |
| 7,159,568 B1 * | 1/2007 | Lewis et al. ............... 123/431 |
| 8,033,108 B2 * | 10/2011 | Ishikawa et al. ............ 60/602 |
| 2003/0074899 A1 * | 4/2003 | Yamaguchi et al. .......... 60/612 |
| 2004/0181331 A1 * | 9/2004 | Nagaishi et al. ............ 701/104 |
| 2004/0255581 A1 * | 12/2004 | McEwen .................... 60/602 |
| 2005/0188682 A1 * | 9/2005 | Fledersbacher et al. ...... 60/284 |
| 2005/0235979 A1 * | 10/2005 | Whittaker .................. 126/19.5 |
| 2006/0059910 A1 * | 3/2006 | Spaeder et al. ............. 60/612 |
| 2006/0123782 A1 * | 6/2006 | Rosin et al. ............... 60/599 |
| 2006/0137343 A1 * | 6/2006 | Grissom et al. ............. 60/602 |
| 2007/0079612 A1 * | 4/2007 | Grissom .................... 60/602 |
| 2007/0169479 A1 * | 7/2007 | Nicolle et al. ............. 60/612 |

* cited by examiner

MULTI-STAGE TURBOCHARGING SYSTEM WITH THERMAL BYPASS

FIELD OF THE INVENTION

This invention is directed to a multi-stage turbocharging system for an internal combustion engine and more particularly to flow control in the system adapted to reduce thermal losses in the exhaust gas flowing to the after-treatment devices, e.g., catalytic converter.

BACKGROUND OF THE INVENTION

An internal combustion engine may be provided with one or more turbochargers, which are a type of forced induction system, for compressing a fluid (air or fuel/air mixture) supplied to one or more combustion chambers within corresponding combustion cylinders, thus boosting the engine's capability without significantly increasing weight. Turbochargers extract heat energy from the exhaust flow from the engine, and convert that heat energy into power to rotate a turbine, which in turn drives a compressor.

One problem with turbochargers is that they often do not provide an immediate air boost when the vehicle operator depresses the accelerator pedal, so-called "turbo lag" or boost lag. One way to decrease turbo lag is to reduce the size of the turbine stage. However, a smaller turbine ("turbo") stage with lower rotating inertia, while improving transient response, may be unable to produce the mass flow required at higher engine speed. A larger turbocharger can produce the mass flow required at high engine speed, but may experience greater turbo lag because the inertia of the rotating parts is greater, so it takes longer to accelerate to its required speed.

Dual-turbo systems have been designed to solve the above problem. A dual-turbo system can be a parallel dual-turbo system, a sequential dual-turbo system, or a parallel-series dual-turbo system. The parallel dual-turbo system has two small turbos, one being active across the entire engine speed range with the other becoming active only at higher engine speed. The sequential dual-turbo system uses two turbochargers of different sizes. The smaller turbocharger, with lower inertia, spins up to speed very quickly, reducing lag and improving low-end boost, while the larger turbocharger can be activated at higher speeds to provide more flow capacity. The parallel-series configuration has valving which can vary the turbine flow to either turbine, in either a parallel configuration, or a series configuration. This is known as a Regulated Two Stage (R2S) system. In any of these configurations the compressor stages can be parallel, sequential, series, or a combination of any configuration.

In emission controlled diesel engines, catalytic aftertreatments can be used to meet emission standards. The pollutant-converting catalysts typically require a minimum temperature to start up and work effectively. The two-stage turbocharging systems can provide high boost and reduce turbo lag. However, after the exhaust goes through both turbine stages of the two-stage turbocharging, it has cooled down significantly depending on how much boost is being made and how much work is being extracted from the exhaust. Another factor is the thermal inertia of the two-stage turbine castings, which can consume heat energy otherwise useful to the aftertreatment. This can cause difficulty for the catalyst to "light off" at initial startup and maintain a proper working temperature at idle and very low power conditions.

Figure 1:
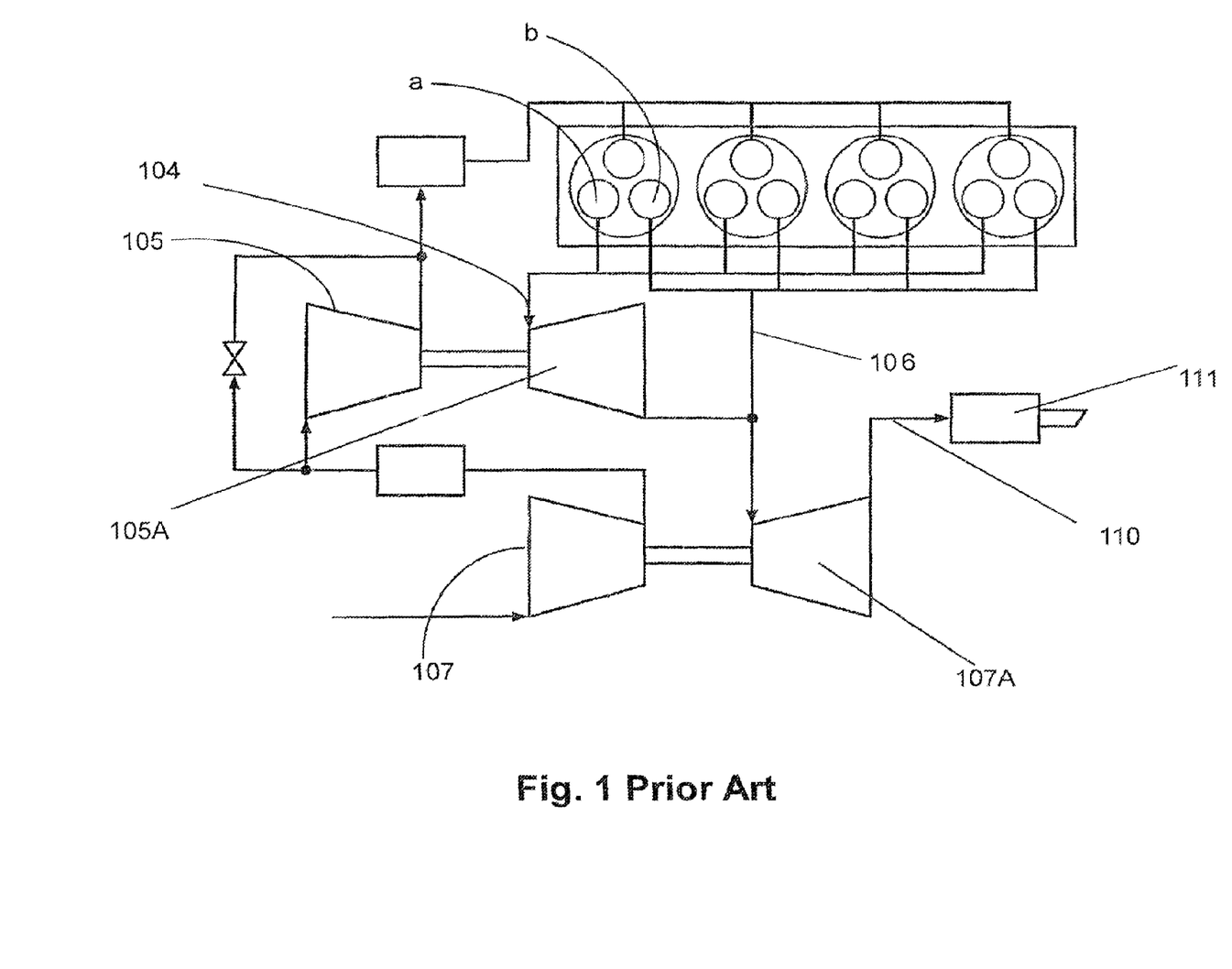
FIG. 1 schematically shows one embodiment of a turbocharged internal combustion engine according to U.S. Publication No. 2007/0119168 A1.

In U.S. Patent Application Publication No. US 2007/0119168 A1 to Turner, a turbocharged internal combustion engine is described as shown in FIG. 1 having a two-stage charging system. Each cylinder has two exhaust valves "a" and "b", where each valve "b" can be opened independently of the valve "a." The exhaust valves "a" of all cylinders are connected to a first exhaust duct (104) which leads the exhaust gases to the turbine part (105A) of a high pressure turbocharger (105) and the exhaust valves "b" of all cylinders are connected to a second exhaust duct (106) through which the exhaust gases flow to the turbine part (107A) of a low pressure turbocharger (107), bypassing the high pressure turbocharger (105). The exhaust gases exiting the turbine (107A) of the low pressure turbocharger (107) pass through an exhaust passage (110) to atmosphere via a catalytic converter (111). Although the high pressure turbocharger (105) may be bypassed on start-up of the engine to reduce the time to light off the catalyst (111), this does not solve the problem of delayed "light off" at initial startup because the exhaust gases may not have high enough temperature to light off the catalyst immediately after passing through the low pressure turbocharger (107).

Figure 2:
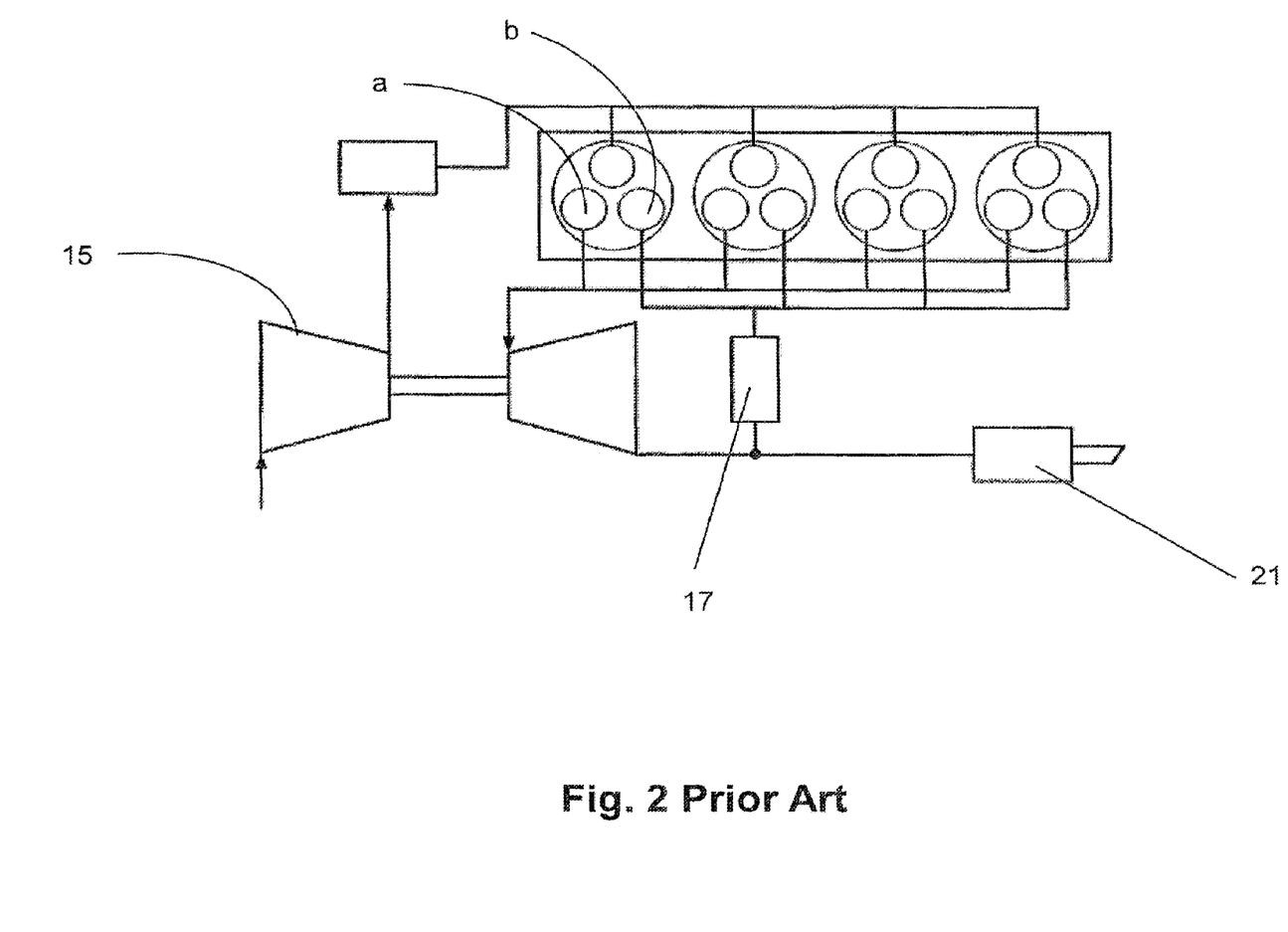
FIG. 2 schematically shows another embodiment of a turbocharged internal combustion engine according to U.S. Publication No. 2007/0119168 A1.

Turner also discloses another embodiment as shown in FIG. 2 in which the exhaust gases can bypass the single turbocharger (15) and flow directly to the starter catalytic converter (17) and then flow through the main catalytic converter (21). This system of Turner, however, does not provide a two-stage turbocharging system which can provide the necessary boost while reducing turbo-lag. This system of Turner also requires two separate catalytic converters, which increases the cost of the system, complicates the flow path, and occupies additional space in an engine compartment that typically has little space to spare.

Figure 3:
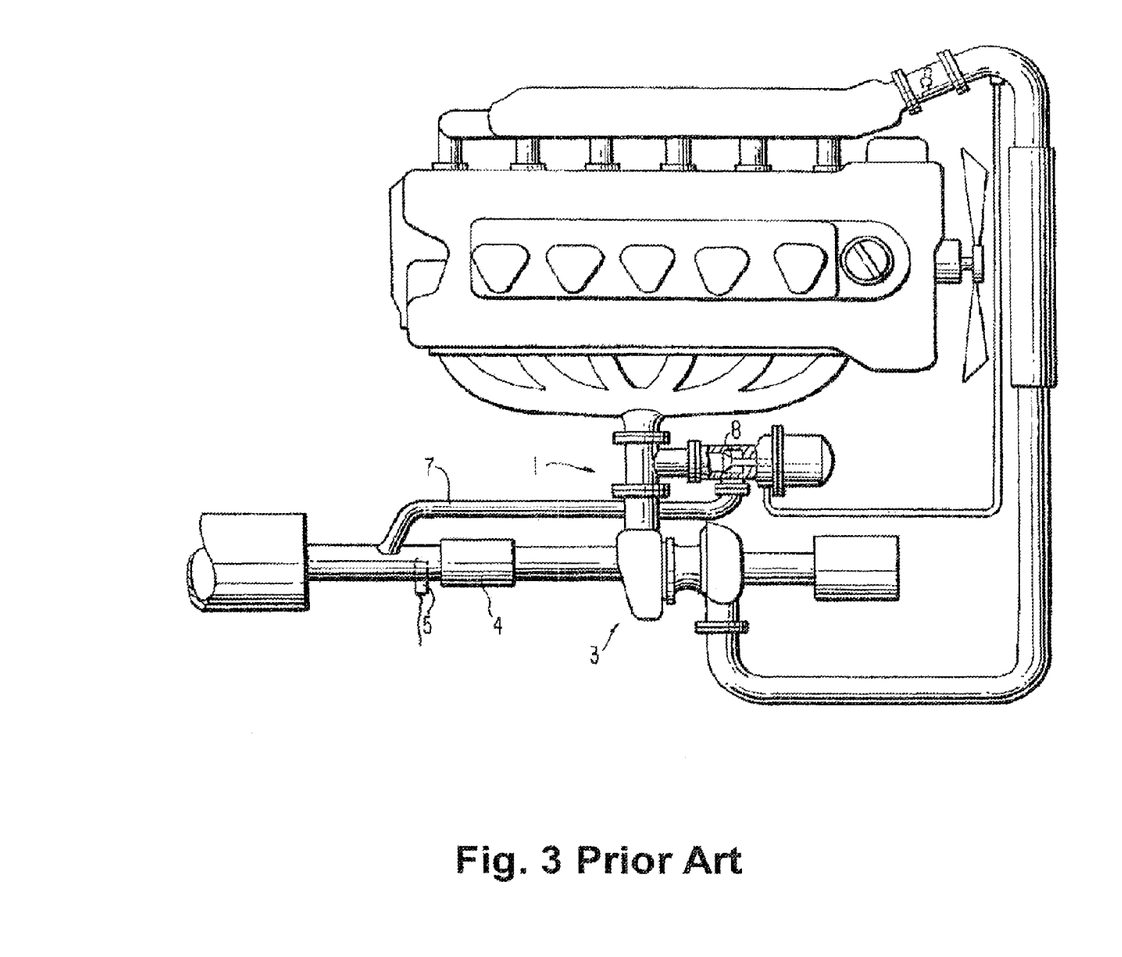
FIG. 3 is a schematic plan view of an exhaust pipe arrangement for a turbocharged multi-cylinder internal combustion engine according to U.S. Pat. No. 4,444,012.

In FIG. 3, U.S. Pat. No. 4,444,012 to Gauffres discloses an exhaust pipe arrangement for internal combustion engines similar to the embodiment shown in FIG. 2 described above. As shown in FIG. 3, in the Gauffres exhaust pipe arrangement, a bypass conduit (7) branches off from the exhaust pipe (1) and bypasses or circumvents the exhaust gas turbocharger (3). Different from the Turner embodiment shown in FIG. 2, in the Gauffres arrangement the bypass conduit (7) terminates in the exhaust pipe at a position downstream of the starter catalyst (4) and the oxygen sensor (5) as controlled by a blow off valve (8). This system of Gauffres, however, also does not provide a two-stage turbocharging system which can provide the necessary boost while reducing turbo-lag. This system of Turner also requires two separate catalytic converters, which increases the cost of the system, complicates the flow path, and occupies additional space in an engine compartment that typically has little space to spare.

Thus, there is a need for a multi-stage turbocharging system that facilitates the immediate light off of the catalyst at the initial startup of the engine. There is a further need for such a system that is cost-effective, space-efficient, and/or reliable.

SUMMARY OF THE INVENTION

The exemplary embodiments of the two-stage turbocharging system can have a channel or valve assembly that bypasses both turbines to let the exhaust gases directly flow from the engine to the catalytic converter or other after-treatment devices to facilitate the immediate light off of the catalyst at initial startup of the engine. The exemplary embodiments are cost effective and dependable. More specifically, the invention is embodied by a multi-stage turbocharging system comprising at a high pressure (HP) turbine and a low pressure (LP) turbine, the HP turbine having an inlet and an outlet and the LP turbine having an inlet and an outlet, E-HP exhaust piping adapted for fluidly connecting an engine to said HP turbine inlet, HP-LP exhaust piping fluidly connecting said HP turbine outlet to said LP turbine inlet, LP-A exhaust piping fluidly connecting said LP turbine outlet to an aftertreatment device, and branched bypass piping having an inlet and first and second branches, each branch having an outlet, with the inlet being fluidly connected to the E-HP exhaust piping, with the first branch outlet being fluidly connected to the LP turbine inlet, with the second branch outlet being fluidly connected to the aftertreatment device, and with an R2S valve in said first branch and a warm-up valve in said second branch. In a preferred embodiment of the invention, the R2S valve and the warm-up valve are integrated into a single exhaust flow control unit.

In one aspect of the invention, a valve assembly for a two-stage turbocharging system including a high pressure (HP) turbine and a low pressure (LP) turbine is provided. The valve assembly includes a first valve upstream of and in fluid communication with an inlet of the HP turbine; and a first channel in fluid communication with the first valve and an outlet of the LP turbine. The first valve can selectively open to bypass at least a portion of exhaust gas around both of the HP and LP turbines.

In another aspect of the invention, a two-stage turbocharging system is provided. The system can include a HP turbine having a HP inlet, a HP outlet, and a HP volute; a LP turbine having a LP inlet, a LP outlet, and a LP volute; a catalytic converter or other after-treatment device located downstream of the LP turbine; and a valve assembly for controlling a flow of exhaust gas. The valve assembly can include a first channel from the HP inlet to the LP outlet and a first valve operably connected to the first channel. Opening of the valve causes exhaust gas to bypass both the HP and LP turbines and flow to the catalytic converter.

In yet another aspect, a method of controlling emissions in an internal combustion engine is provided. The method includes providing a multiple stage turbocharger having at least a HP turbine with a HP inlet and outlet and a LP turbine with a LP inlet and outlet; providing a catalytic converter or other after-treatment device downstream of the LP turbine, where the catalytic converter has a temperature threshold for achieving light off of the catalyst, and bypassing exhaust gas around both the HP turbine and the LP turbine to the catalytic converter as necessary so that the temperature of the catalyst quickly reaches at least the temperature threshold.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Referring to FIGS. 4-10, an exemplary embodiment of a high pressure turbine stage (400) is shown having a valve assembly, which has a R2S valve (420) and a warm up valve (430) in a turbine housing (411). The R2S valve (420) can selectively bypass a high pressure (HP) turbine wheel (401) by providing the exhaust gas or a portion thereof from a HP inlet to a LP inlet. The warm up valve (430) can selectively bypass both the HP turbine wheel (401) and the low pressure (LP) turbine wheel (801) by providing the exhaust gas, or a portion thereof, from the HP inlet to the LP eductor or to some other area downstream (e.g., a vehicle downpipe) of the LP turbine. In one embodiment, at the initial start-up of the engine, at least a portion of the exhaust gas can flow directly to the after-treatment devices (e.g., catalytic converter) (850) through the warm up valve (430) to achieve "catalyst light off" more quickly and maintain a desired working temperature of the catalyst. After the catalyst has been lit off, the warm up valve (430) can be closed so that all of the exhaust gas flows through the turbines to drive the compressors to provide the engine with a desired level of boost. In one embodiment, such as for catalysts having relatively low light off temperatures, a combination of opening of the warm up valve (430) and opening of the R2S valve (420) may be used so that the temperature of the exhaust gas reaching the catalyst (850) remains high enough to achieve a desired "light off temperature." The R2S valve (420) can also be used to control the amount of flow from the HP turbine (400) to the LP turbine (870), to provide turbine power to either or both turbines in order to meet boost and turbine backpressure requirements.

In one embodiment, the valves (420 and 430) can be positioned in a first part (410) of a multi-part turbine housing (411). While the exemplary embodiments describe a two-part HP turbine housing, the present disclosure contemplates any number of parts being used for the housing assembly. A first chamber (450) can be formed in the first part (410) of the turbine housing (411) and a second chamber (475) can also be formed in the first part (410), such as being defined in part, and separated by, a dividing wall (460). The second part (510), which can be the termination of the exhaust manifold or a pipe from the exhaust manifold, can be removably bolted or otherwise removably connected to the first part (410) to allow for access to the valves (420 and 430). The second part (510) can define a duct (301). A channel can be formed or defined in the turbine housing (411), such as with an inlet connected to the second chamber (475), to provide fluid communication into the HP turbine (400), through the duct (610) on the downstream side of the R2S valve (420).

Either or both of the valves (420 and 430) can be a circular plate or flap that can seal against a corresponding opening or outlet in the turbine housing (411). The present disclosure contemplates the use of other shapes of the valves (420 and 430) and/or the outlets, including square valves and outlets. Metal "O"-rings or other sealing structures can be provided with the valves (420 and 430) to help maintain a seal. In one embodiment, a ridge or other sealing structure can be formed along the periphery of the outlets and/or the valves (420 and 430) to further promote proper sealing.

The R2S valve (420) may be actuated by a controller or actuator (425), while the warm up valve (430) may be actuated by a controller or actuator (435). The actuators (425, 435) can be connected to the valves (420, 430), respectively, by linkages that translate linear movement from the actuator to rotational movement of the valves. The particular components of the linkages can be chosen by one of ordinary skill in the art based upon a number of factors, including reliability and cost. The actuators (425, 435) can be pneumatic, such as in fluid communication with a high pressure area of the engine system, including connected to one of the compressors (860 or 875) via a conduit or tubing (not shown), or from the pneumatic supply system of the vehicle. The present disclosure also contemplates the use of other pressure or power sources for the actuators (425, 435). The present disclosure further contemplates the use of other types of actuators, including hydraulic and vacuum actuators. In one embodiment, one or both of the actuators (425, 435) can be an electronic actuator. The electronic actuator can use various components, such as a solenoid to drive the linkages.

Figure 5:
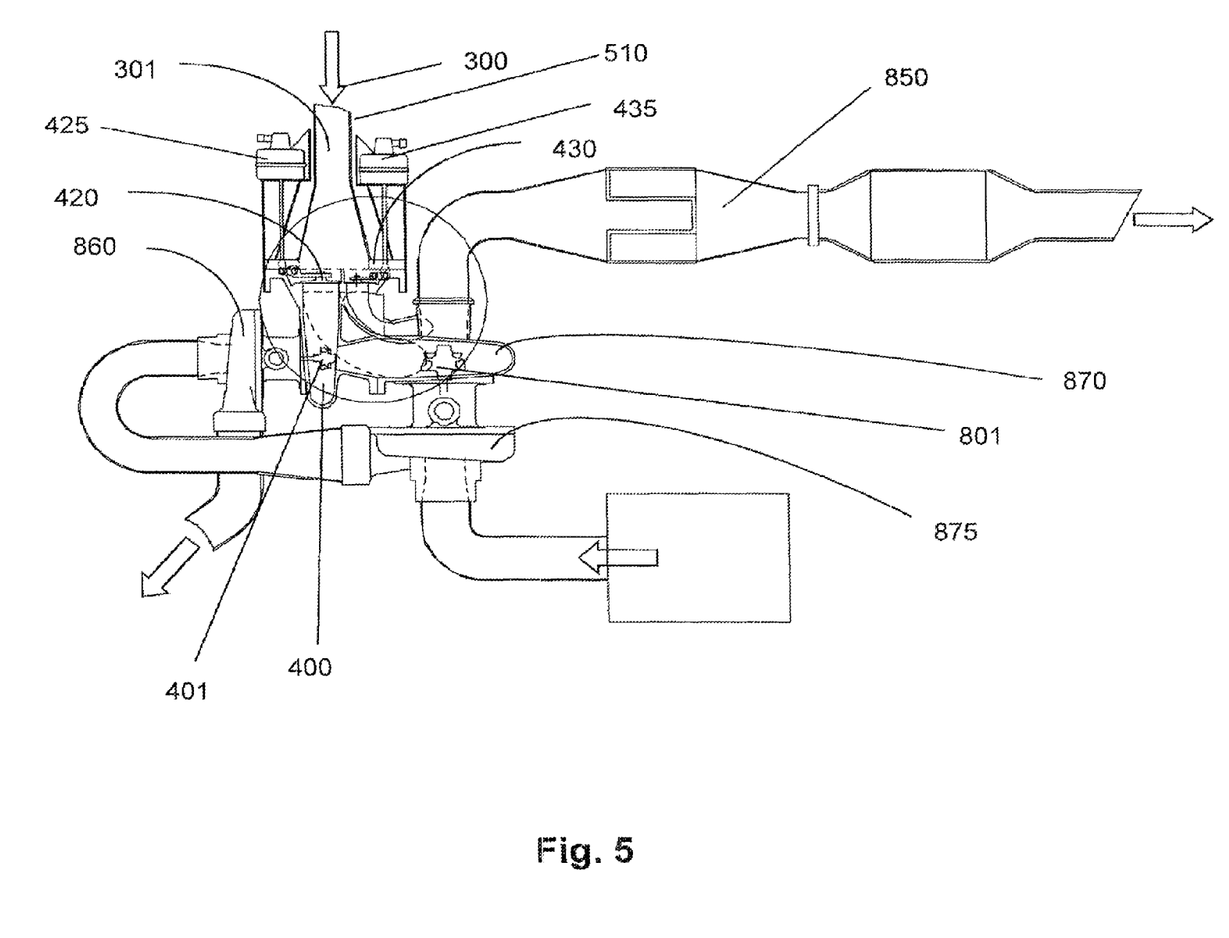
FIG. 5 is a plan view of an exemplary embodiment of the layout of a regulated 2-stage (R2S) turbocharger system.
Figure 6:
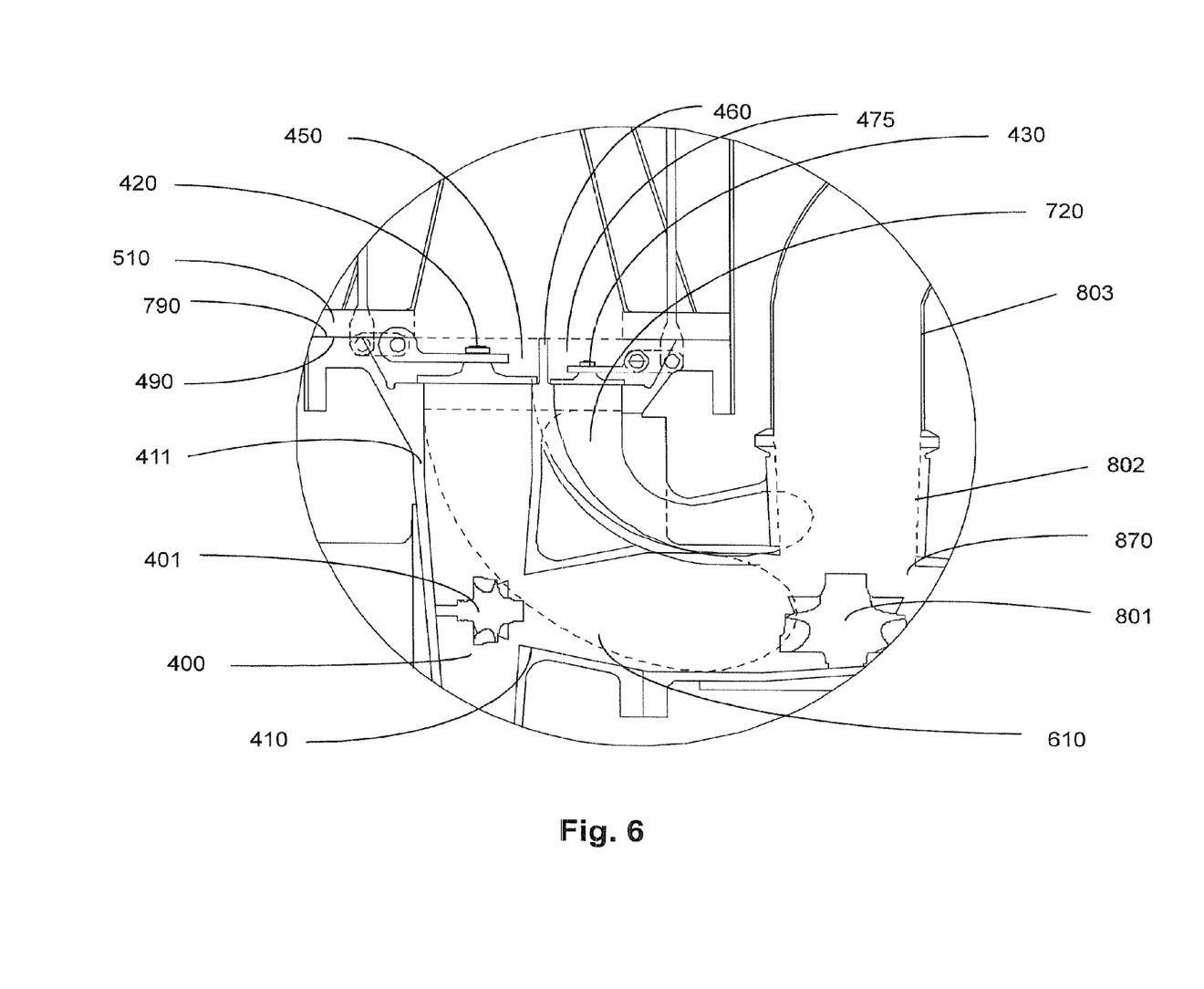
FIG. 6 is a magnified view of the valving area of FIG. 5.
Figure 7:
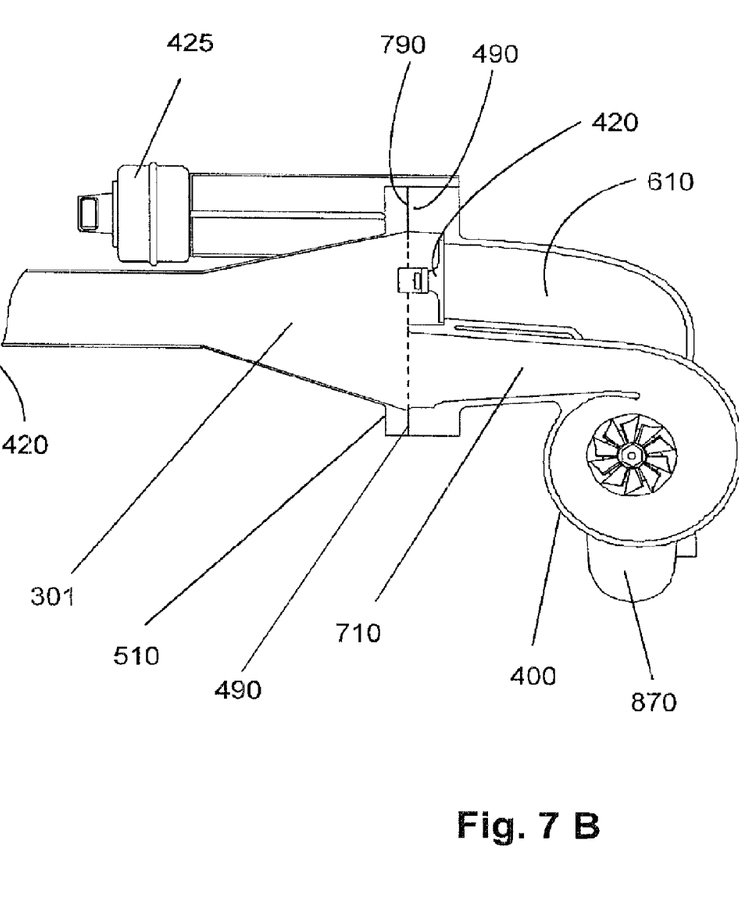
FIG. 7A is an end view of the valve area.
FIG. 7B is a side view of the valve area.

In an enlarged view, the valving in FIG. 5 is shown more clearly in FIG. 6. The second part (510) can have bolt holes that align with bolt holes of the first part (411). The second part (510) can have a substantially flat or planar face (790) that abuts against a substantially flat or planar face (490) of the first part (410) to provide a sealing engagement therebetween when the first and second parts are connected to each other. Sealing structure, including gaskets and the like, can be positioned therebetween to enhance the seal. An opening or passage (610) leads to the volute of the LP turbine (870) can sealingly engage with the first chamber (450), while an opening or passage (720) that bypasses both the HP and LP turbine wheels (401, 801) can sealingly engage with the second chamber (475).

Figure 8:
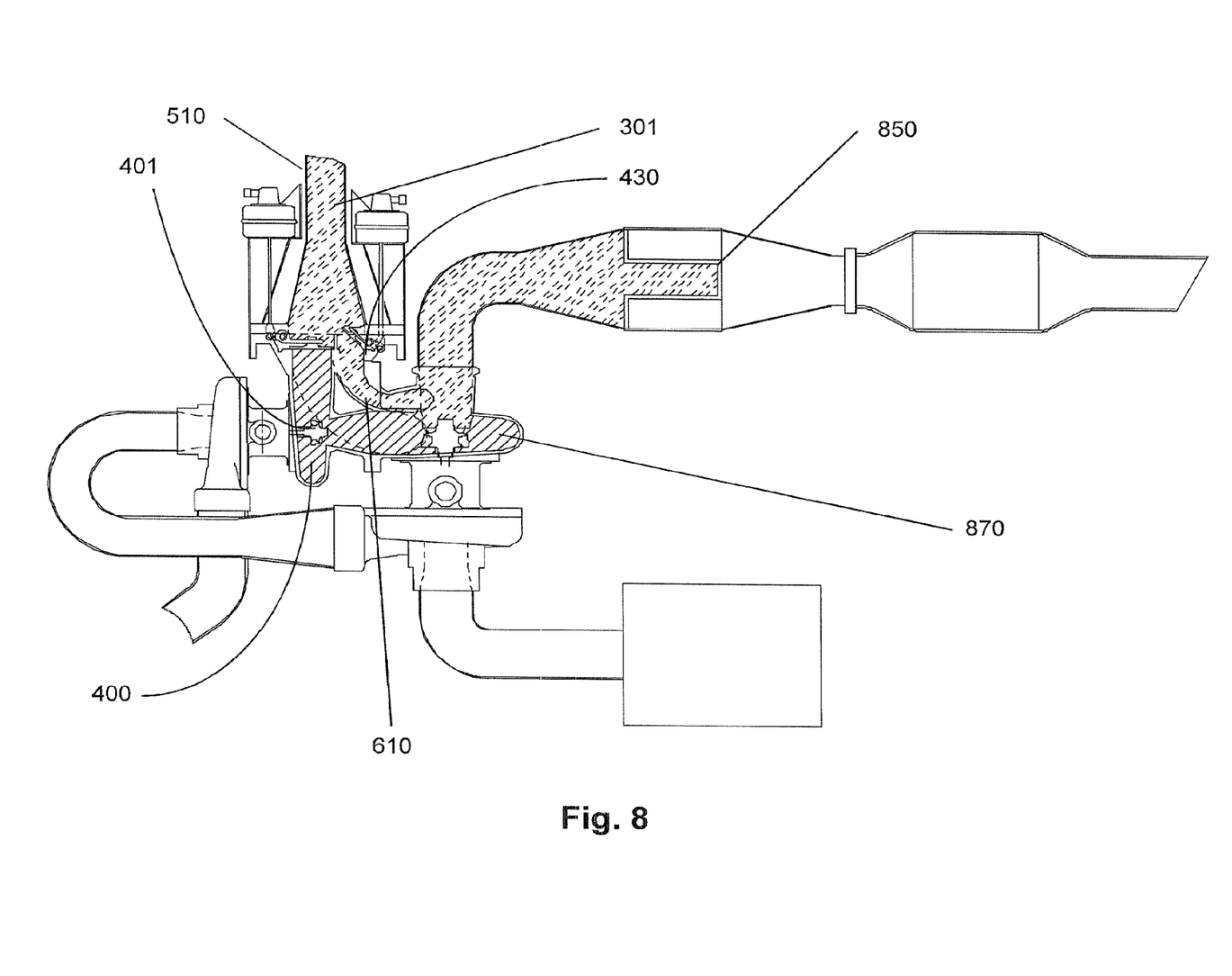
FIG. 8 is a plan view showing the flow bypassing the HP and LP turbine stages.

As shown in FIGS. 5 and 6 exhaust flow (300) in a duct (310) from the exhaust manifold to the turbocharger delivers exhaust gas to the chambers (450 and 475) in the foot of the turbine stage of the HP turbocharger. In addition to these chambers there exists a duct (710) (FIGS. 7A and 7B), fluidly connecting the duct (301) from the exhaust manifold to the volute, and turbine wheel (401) of the HP turbine stage. This duct, which always supplies exhaust gas to the HP turbine wheel, is defined as "flow path 1". This flow path is depicted in FIG. 8 by the solid shading. Since the majority of exhaust gas is flowing through the warm up valve (430) bypassing the HP turbine (400), and the LP turbine (870), the majority of the heat energy in the exhaust gas will reach the catalytic converter and other after-treatment devices. The only exhaust gas entering the HP and LP turbine stages is what the pressure differential across the valves allows in the duct (710) connecting the HP turbine stage (400) with the duct (301) from the exhaust manifold. The flowpath through the warm up valve (430) and duct (610) to the exducer (802) of the LP turbine (870), and thence through the downpipe (803) which directs the spent exhaust gas flow to the catalytic converter (850) or other after-treatment devices is defined as "flow path 2" and is depicted in FIG. 8 by the more dense broken shading.

Figure 9:
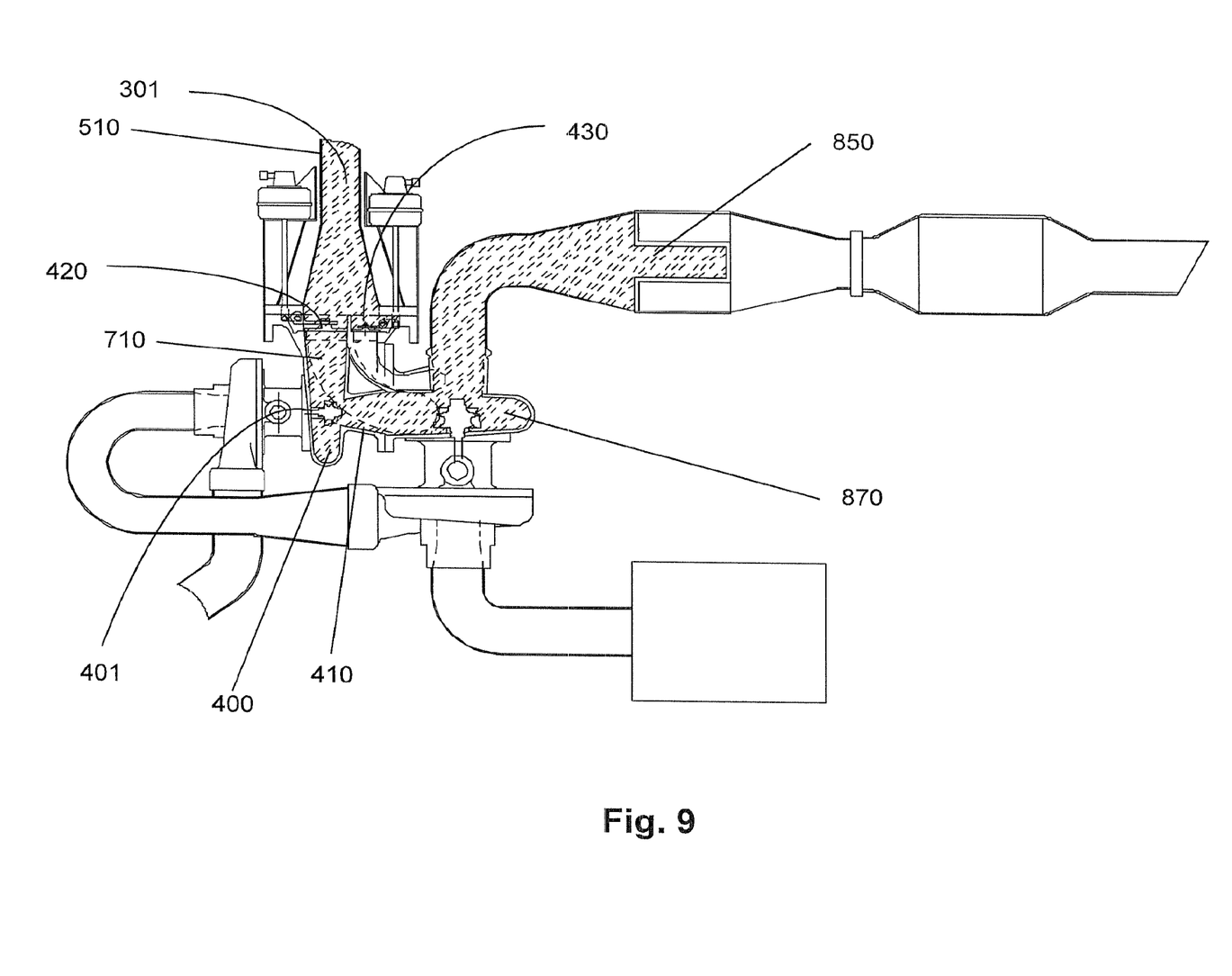
FIG. 9 is a plan view showing the flow of a normally operating R2S system.
Figure 10:
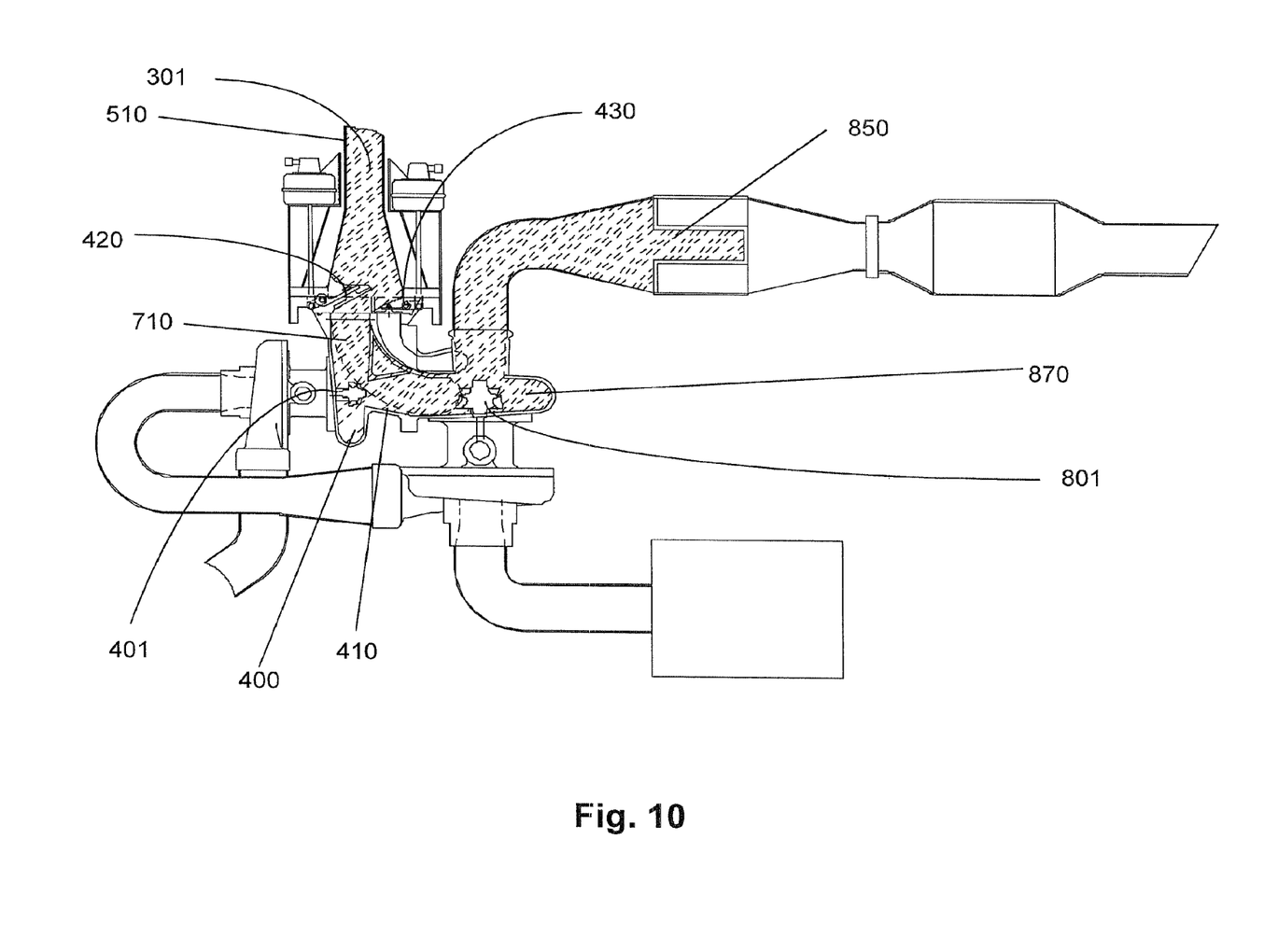
FIG. 10 is a plan view showing the flow of the R2S system with the R2S valve open.

In FIG. 9 both the R2S valve (420) and the warm up valve (430) are in the closed position, forcing all the exhaust gas flow from the exhaust manifold, through the duct (310) fluidly connecting the exhaust manifold to the turbocharger into the duct (710) fluidly connecting the HP turbine (400). The HP turbine wheel (401), in conjunction with its volute, extracts energy from the exhaust gas flow and the flow exits through the HP turbine exducer. In this cavity the gas then flows through the LP turbine (870) in which the LP turbine wheel (801) extracts further energy from the exhaust gas flow. The flow exits the LP turbine wheel (801) through the exducer (802) and enters the downpipe (803), which directs the spent exhaust gas flow to the catalytic converter (850) or other after-treatment devices. This flow path is defined as "flow path 3".

In the normal operating regime of a R2S turbocharger system, the R2S valve (420) is controllable opened, or closed, to allow the flow of "flow path 3" to be altered by directing exhaust gas from the first chamber (450) directly enclosing the upstream region of the R2S valve (420) through the duct (610) fluidly connecting the upstream side of the R2S valve (420) with the inlet to the LP turbine (870) thus providing more thermal energy to the LP turbine wheel (801). This mode is defined as "flow path 3A". This can be seen in FIG. 10.

In the modes of "flow path 3", and/or "flow path 3A" much of the surface area of both turbine housings are wetted by the exhaust gas flow. In addition to the "wetting" of the turbine housing and connecting duct walls, work is being extracted from the exhaust gas by the turbine stage operation (converting heat energy to turbine wheel torque) thus removing much heat energy from the exhaust gas. As a result of this conduction and work transfer the temperature of the exhaust gas reaching the after-treatment is lower than in the case of "flow path 2".

The valve assembly can be controlled to open or close different paths at any given time to optimize the engine performance and emission through use of the valves (420, 430) and their corresponding actuators (425, 435).

The "flow path 2" passage can be utilized at the initial start-up of the engine to allow at least a portion of the exhaust gas to flow directly to the catalytic converter without passing through the turbines to maintain a desired temperature of the exhaust gas and achieve immediate light-off of the catalytic converter. After the catalytic converter has been lit-off, the passage, "flow path 2" which bypasses both turbine (400, 870) can be closed in order for all the exhaust gas to flow through the turbines (400, 870) to provide the engine with the desired boost, or back pressure.

In one embodiment, the actuator (425) can be pre-assembled with the valve (420) and/or the actuator (435) can be pre-assembled with the valve (430). The pre-assemblies can be positioned in the first part (410) of the turbine housing (411) such as through a port or the like formed in the turbine housing which is then sealed.

Figure 4:
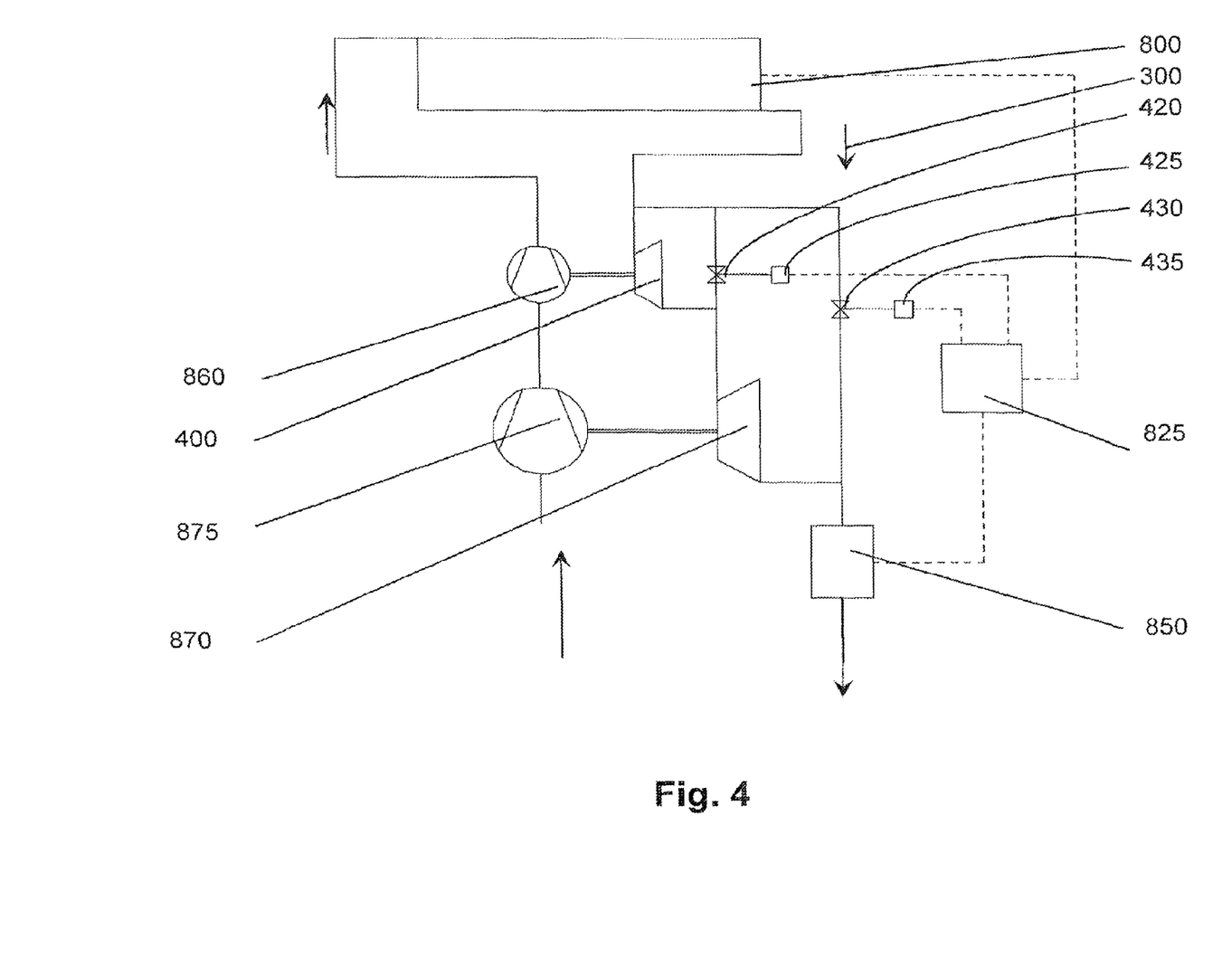
FIG. 4 is a schematic of the exemplary embodiment of the invention.

As shown more clearly in the schematic in FIG. 4, a control module (825) or other processor can control the actuators (425 and 435) for bypassing either or both of the HP and LP turbines (400, 870). For example, the control module (825) can receive data from sensors positioned with respect to the internal combustion engine (800) and/or the catalytic converter (850), and open one or both of the valves (420) and (430) to obtain a desired flow through the turbocharger system. In one embodiment, temperature sensors can be positioned in thermal communication with the catalytic converter (850) to determine a temperature of the exhaust gas therethrough. Either, or both of the valves (420 and 430), can then be opened in order to increase the exhaust gas temperature flowing through the catalytic converter (850) to facilitate light-off of the catalytic converter. The particular amount of exhaust flow that is bypassing either or both of the HP and LP turbines (400, 870) can vary depending on a number of factors, including the type of catalyst being used and the environmental conditions. In one embodiment, a substantial portion of the exhaust gas can bypass both of the HP and LP turbines (400, 870) by opening of the valve (430), such as for high temperature catalysts. Other data associated with the engine (800) can also be monitored for implementing control to the multi-stage turbocharger system, including engine speed.

The exemplary embodiments are described with respect to a two stage turbocharger. However, it should be understood by one of ordinary skill in the art that the system and method described herein can be applied to a turbocharger having more than two stages, where the first stage can be considered as the high pressure stage and the last stage considered as the low pressure stage, with any number of other stages in between being the middle pressure stages.

While the invention has been described by reference to a specific embodiment chosen for purposes of illustration, it should be apparent that numerous modifications could be made thereto by those skilled in the art without departing from the spirit and scope of the invention.

The invention claimed is:

1. A multi-stage turbocharging system comprising:
   a high pressure (HP) turbine (400) and a low pressure (LP) turbine (870), the HP turbine having an inlet and an outlet and the LP turbine having an inlet and an outlet,
   E-HP exhaust piping adapted for fluidly connecting an engine to said HP turbine inlet,
   HP-LP exhaust piping fluidly connecting said HP turbine outlet to said LP turbine inlet,
   LP-A exhaust piping fluidly connecting said LP turbine outlet to an aftertreatment device, and
   branched bypass piping having an inlet and first and second branches, each branch having an outlet, with the inlet being fluidly connected to the E-HP exhaust piping, with the first branch outlet being fluidly connected to the LP turbine inlet, with the second branch outlet being fluidly connected to the aftertreatment device, and with an R2S valve (420) in said first branch and a warm-up valve (430) in said second branch,
   wherein said R2S valve (420) and said warm-up valve (430) are housed in a single housing.

2. The system according to claim 1, wherein said HP turbine includes a turbine housing, and wherein said R2S valve (420) and said warm-up valve (430) are integrated in said HP turbine housing.

3. The system according to claim 1, wherein said HP turbine includes a turbine housing, and wherein said R2S valve (420) and said warm-up valve (430) are provided in a housing separate from said HP turbine housing.

4. The system according to claim 1, wherein said HP turbine is a twin volute turbine.

5. The system according to claim 1, further comprising control means including a control module (825) for controlling said valves, wherein said R2S valve (420) is a variable valve, and wherein when said warm-up valve (430) is closed, said R2S valve is variably controllable to alter the ratio of exhaust gas flow between the HP turbine and the LP turbine.

6. The system according to claim 5, wherein said R2S valve (420) is actuated by a controller or actuator (425), and the warm up valve (430) is actuated by a separate controller or actuator (435).

7. The system according to claim 6, wherein the actuators (425, 435) are connected to the valves (420, 430), respectively, by linkages that translate linear movement from the actuator to rotational movement of the valves.

8. The system according to claim 6, further comprising
   at least one sensor monitoring at least one parameter of the internal combustion engine (800) or the aftertreatment device,
   control module (825) receiving input from said sensor and in response thereto controlling the actuators (425 and 435) for opening one or both of the valves (420) and (430) and bypassing either or both of the HP and LP turbines (400, 870) to obtain a desired flow through the turbocharger system.

9. The system according to claim 8, wherein said sensor is a temperature sensor in thermal communication with the aftertreatment device.

10. The system according to claim 9, wherein when said control module (825) evaluates a temperature signal from the sensor as being below a predetermined threshold, said control module (825) controls said R2S valve (420) to close and said warm-up valve (430) to fully open, and when said control module (825) evaluates a temperature signal from the sensor as being above a predetermined threshold, controls said warm-up valve (430) to fully close.

11. The system according to claim 8, wherein when said control module (825) evaluates a temperature signal from the sensor as being below a predetermined threshold, said control module (825) controls said warm-up valve to fully open, and when said control module (825) evaluates a temperature signal from the sensor as being above a predetermined threshold, said control module (825) controls said warm-up valve to fully close.

12. The system according to claim 1, wherein said aftertreatment device is a catalytic converter (850), a Diesel Oxidation Catalyst, a particle filter regeneration device, or a windshield warmer.

* * * * *